(12) United States Patent
Craig et al.

(10) Patent No.: US 6,236,018 B1
(45) Date of Patent: May 22, 2001

(54) PART FEEDER SYSTEM

(75) Inventors: James H. Craig, Warren; Donald L. Yake, Bluffton, both of IN (US)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/317,753

(22) Filed: May 24, 1999

Related U.S. Application Data (60) Provisional application No. 60/086,729, filed on May 26, 1998.

(51) Int. Cl.⁷ .................................................. B23K 31/00
(52) U.S. Cl. ............................................... 219/158
(58) Field of Search ................................. 219/98, 99, 158

(56) References Cited

U.S. PATENT DOCUMENTS

| | | | |
|---|---|---|---|
| 3,312,810 | * | 4/1967 | Neumeir ................................. 219/98 |
| 4,420,674 | * | 12/1983 | Jordan ..................................... 219/98 |
| 5,171,959 | | 12/1992 | Schmitt et al. . |
| 5,349,152 | | 9/1994 | Renner . |
| 5,834,728 | | 11/1998 | Mauer et al. . |
| 5,868,303 | | 2/1999 | Roser . |

OTHER PUBLICATIONS

Emhart Fastening Teknologies—Weldfast, Emhart Automated Fastening Equipment, http://www.emhart.com/products/weldfast.html, May 21, 1999, 2 pages.

* cited by examiner

Primary Examiner—Clifford C. Shaw
(74) Attorney, Agent, or Firm—Harness, Dickey & Pierce, P.L.C.

(57) ABSTRACT

A part feeder system includes a shipping container having a web of connected parts and a part presentation unit which performs work on the parts prior to installation or assembly of the finished parts. In another aspect of the present invention, the web of parts is automatically fed from the shipping container to the part presentation unit when the shipping container is in a predetermined position relative to the part presentation unit.

32 Claims, 6 Drawing Sheets

PART FEEDER SYSTEM

CROSS REFERENCE TO RELATED APPLICATIONS

The present application is a continuation-in-part of co-pending U.S. Provisional Patent Application Ser. No. 60/086,729, filed on May 26, 1998, entitled "Parts Feeder System for an Automatic Welder," which is incorporated by reference herein.

BACKGROUND OF THE INVENTION

The present invention relates generally to a system for feeding parts and more specifically to a system which supplies parts in an automated manner to a machine for placement of those parts, for example, by sequentially welding a series of such parts to an automotive vehicle body in an assembly line.

It is generally known in the electrical industry to employ a series of progressive dies to punch and fold a connected web or strip of electrical terminals for later attachment to discretely insulated wires. Such a traditional web of terminals is often temporarily stored on a spool or reel prior to wire fastening.

It is also known to weld brackets and studs on automotive vehicle bodies. For example, reference should be made to U.S. Pat. No. 5,868,303 entitled "Tack Gripper for a Tack Welding Gun and Process for Connecting a Strip-Form Workpiece to a Component" which issued to Roser on Feb. 9, 1999; U.S. Pat. No. 5,834,728 entitled "Process and Device for the Application of Components which are Strung Together in the Manner of a Belt onto Workpieces" which issued to Mauer et al. on Nov. 10, 1998; U.S. Pat. No. 5,349,152 entitled "Process for the Electric Welding of Two Weld Parts" which issued to Renner on Sep. 20, 1994; and U.S. Pat. No. 5,171,959 entitled "Arc Welding of a Weld Stud" which issued to Schmitt et al. on Dec. 15, 1992. These patents are incorporated by reference herein.

SUMMARY OF THE INVENTION

In accordance with the present invention, the preferred embodiment of a part feeder system includes a shipping container having a web of connected parts and a part presentation unit which performs work on the parts prior to installation or assembly of the finished parts. In another aspect of the present invention, the web of parts is automatically fed from the shipping container to the part presentation unit when the shipping container is in a predetermined position relative to the part presentation unit. A further aspect of the present invention provides one or more reels within the shipping container for storing a web of the parts. The parts are automatically located and severed from each other by the part presentation unit in still another aspect of the present invention. An additional aspect of the present invention returns scrap from the part presentation unit back to the shipping container. In another aspect of the present invention, the finished parts are singly presented in a discrete manner to a robot or other machine for final welding, assembly or installation. A method of automatically transporting parts between a container and a part processing unit is also provided.

The part feeder system of the present invention is advantageous ver conventional devices in that the present invention is fully automated for use in an assembly plant. The web of parts are first manually set up in the part shipping container at an off-site facility or otherwise remotely located area, by the part supplier. The sealed shipping container is subsequently shipped to the customer assembly facility where assembly line space is at a premium. Furthermore, the automation of the present invention is extremely advantageous in the assembly plant due to the very fast nature of final part assembly onto automotive vehicles, for example, on a moving assembly line. There is little time or space for manual movement, processing and orientation of small parts for subsequent welding operations or the like. Accordingly, the automated feeding, locating, part severing, part orientation and scrap return achieved by the present invention greatly saves labor, time, factory space and cost in the final assembly plant while also enhancing the ability to use the parts with a robotic application.

The part feeder system of the present invention is also advantageous by being shippable in a returnable container which can be simply reloaded and reinitialized. Furthermore, the shipping container of the present invention is sealed from dirt and moisture prior to installation in the part presentation unit. Additional advantages and features of the present invention will become apparent from the following description and appended claims, taken in conjunction with the accompanying drawings.

DETAILED DESCRIPTION OF THE PREFERRED EMBODIMENT

The preferred embodiment of the present invention generally provides a system in which a series of discrete metal parts formed from a stamped metal strip or web are fed to an automatic welding machine for a subsequent welding operation in an automotive vehicle environment. Metal parts used in an automotive vehicle assembly are stamped by a punch press on a metal strip unwound for that purpose from a suitable reel. After punching, the metal strip is rewound onto a second spool or reel. The rewound stamped parts are then transferred to a specially designed pallet which has a spindle for mounting the spool, a brake for holding the spool in position during shipment, and a rack-and-pinion initial feeding mechanism for rotating the spool. One or more pallets are then loaded into a shipping container. The container is sealed and secured for shipment.

At a suitable receiving station the shipping container is loaded by a fork truck onto a loading station or dock portion of a part presentation machine. As the container is being positioned, the brake mechanism is encountered by a spool-release pin member (not shown, since it would only be used for an alternate embodiment) projecting from the part presentation machine and the brake is thereby moved or unlocked. At this juncture for the preferred embodiment, the rack-and-pinion initial feed mechanism is actuated by another feed pin or rod actuator integral with the part presentation machine to thereby cause the reel to be rotated. This presents the metal strip with the metal parts stamped thereon to a second feeding station in the presentation unit or machine. A servo feed roller is activated by a sensor which advances the metal strip from the reel to a cut-off station and thus readies for separation of a single part for subsequent presentation to a robot welder for a welding operation. When the part to be welded is cut off from the metal strip, scrap from the cut-off station is fed via a chute back to the shipping container for return with the empty container to the supplier where the scrap will be removed at the same time that new spools of stamped parts are stored in the container for a repeat operation.

More specifically, FIGS. 1–6 show a shipping container 21, having a number of pallets 23 containing part reels 25 stored therein, which is put in a predetermined place on a dock of a part presentation unit 27 by means of a forklift truck 29. Parts 31, such as a set of stamped steel brackets, are interconnected to each other by bridging tab segments 33 so as to form a continuous web or strip of parts 31. A single continuous web of parts 31 is wound around each reel 25. Only a single reel and related pallet will be discussed hereinafter. Reel 25 has a central hole 35 which is manually mounted upon a central spindle 37 upstanding from pallet 23. A set of rollers 39 or other suitable bearings are disposed on pallet 23. Thus, reel 25 can be readily rotated about spindle 37 when desired. The pallets 23 are slidable into a sheet metal or plastic housing 41 of shipping container 21 through a set of linearly slidable guide tracks 43 and rollers. A rotatable friction brake 61 is located inside shipping container 21. Brake 61 is made from a rubber coated metal. Brake 61 frictionally abuts against a peripheral edge of reel 25 to maintain the reel in a final desired shipping position prior to insertion of shipping container 21 into part presentation unit 27. The pallet is preferably made of an engineering grade plastic, however, welded square metal tubing can also be used.

The web of parts 31 is initially loaded into an initial feeding device 63 in shipping container 21. This initial set-up is done manually in the supplier's part stamping plant prior to container shipment. Before friction brake 61 is allowed to fully engage reel 25, the web of parts 31 is partially unwound from reel 25. The leading parts 31 of the web are inserted through a pair of rubber coated metal rollers 65 and 67 of initial feeding device 63. These parts 31 are then subsequently pushed through a pair of adjacent guides 69. Guides 69 have essentially flat facing internal surfaces and leading external bevels 71. Parts 31 are positioned between the facing flat internal surfaces.

An actuating rack 73 is an elongated member having a set of gear teeth 75. A pinion gear 77 coaxially affixed to roller 65 operably engages teeth 75 of rack 73. Thus, linear movement of rack 73 causes roller 65 to rotate. Roller 67 is biased toward roller 65 by a compression spring 78 such that rotation f rollers 65 and 67 causes parts 31 to advance through guides 69 of shipping container 21. A toothless space on rack 73 allows free spinning of rollers 65 and 67 after the initial feed.

Figure 1:
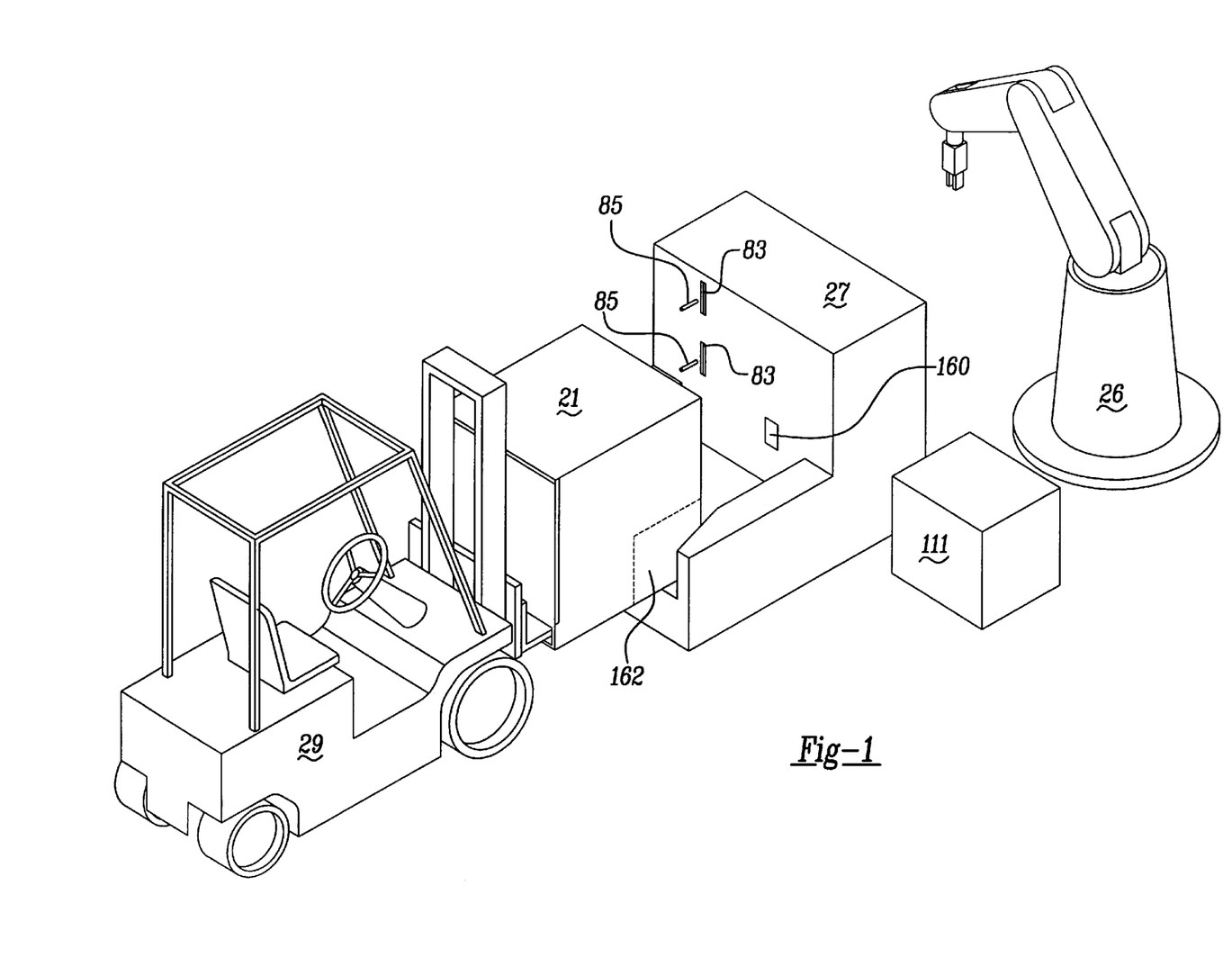
FIG. 1 is a schematic perspective view showing the preferred embodiment of a part feeder system of the present invention, disposed in a disengaged state.
Figure 2:
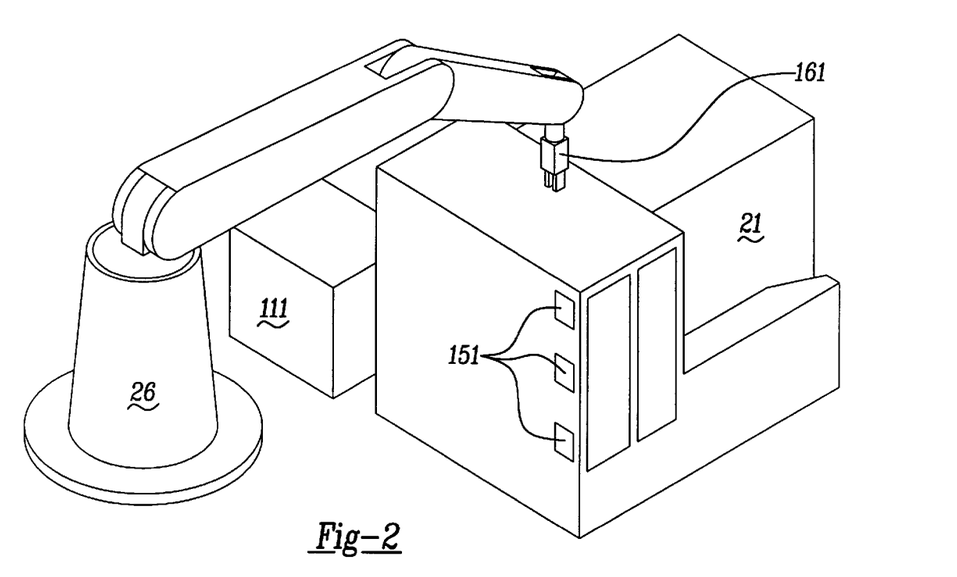
FIG. 2 is a schematic perspective view from the opposite side as shown in FIG. 1, showing the preferred embodiment part feeder system, disposed in an engaged state.
Figure 3:
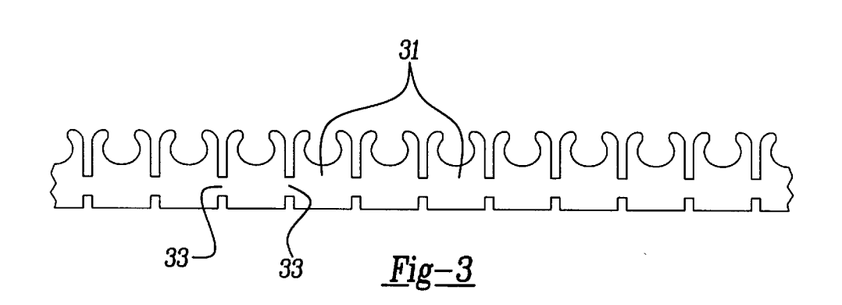
FIG. 3 is a true view showing a web of parts employed in the preferred embodiment part feeder system.
Figure 4:
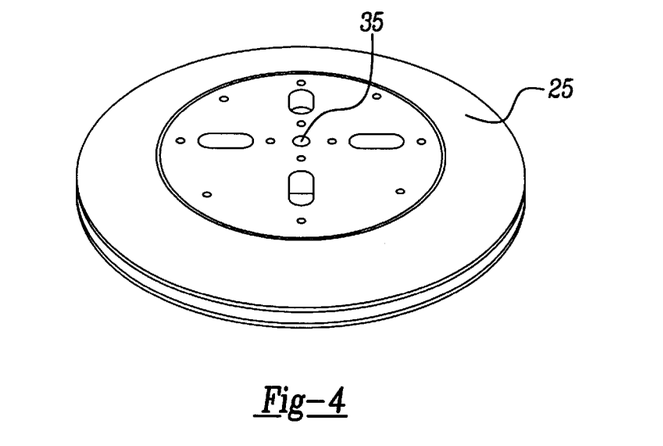
FIG. 4 is a perspective view showing a reel employed in the preferred embodiment part feeder system.
Figure 5:
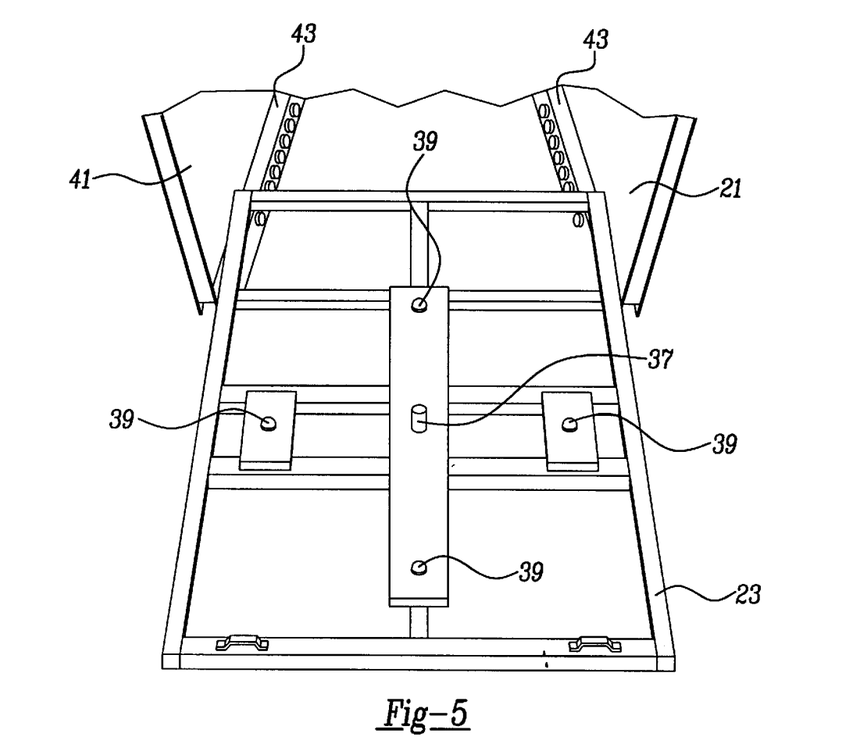
FIG. 5 is a fragmentary perspective view showing a pallet employed in the preferred embodiment part feeder system, disposed in a withdrawn position.
Figure 6:
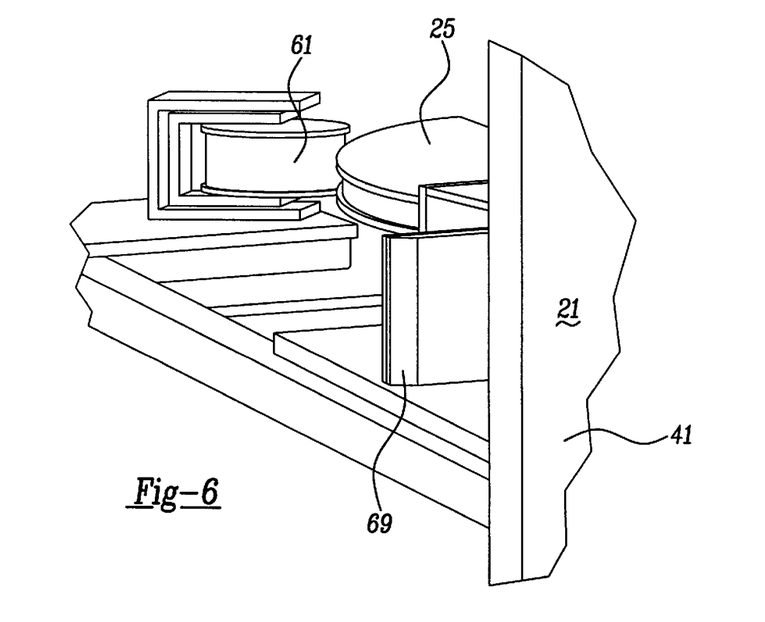
FIG. 6 is a fragmentary perspective view showing a brake and the reel employed in the preferred embodiment part feeder system.
Figure 7:
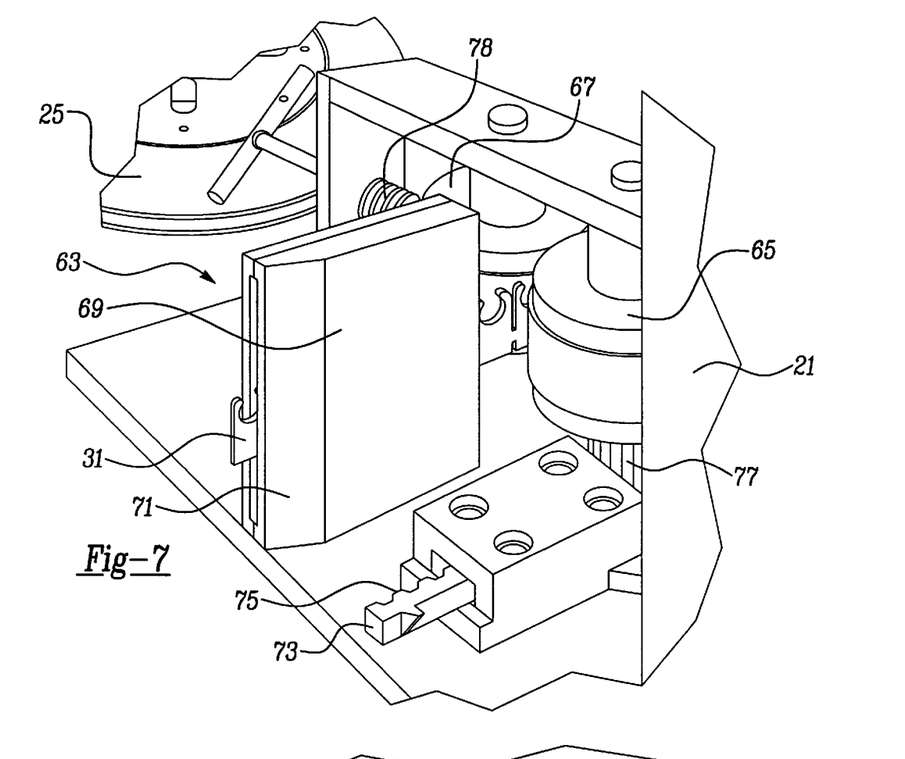
FIG. 7 is a fragmentary perspective view showing the initial part feeding device employed in the preferred embodiment part feeder system, with the parts and reel disposed in a loaded position.
Figure 8:
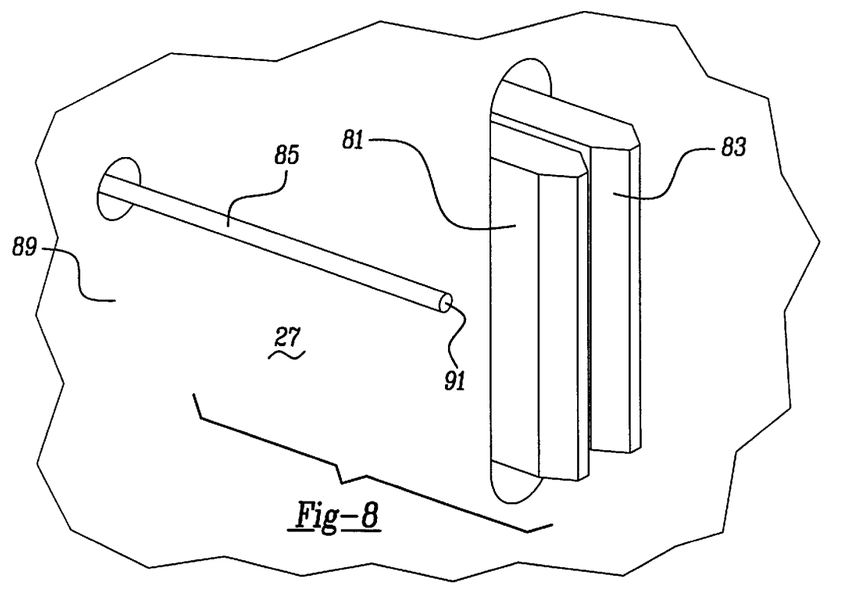
FIG. 8 is a fragmentary perspective view showing an actuating rod and inlet employed in the preferred embodiment part feeder system.
Figure 9:
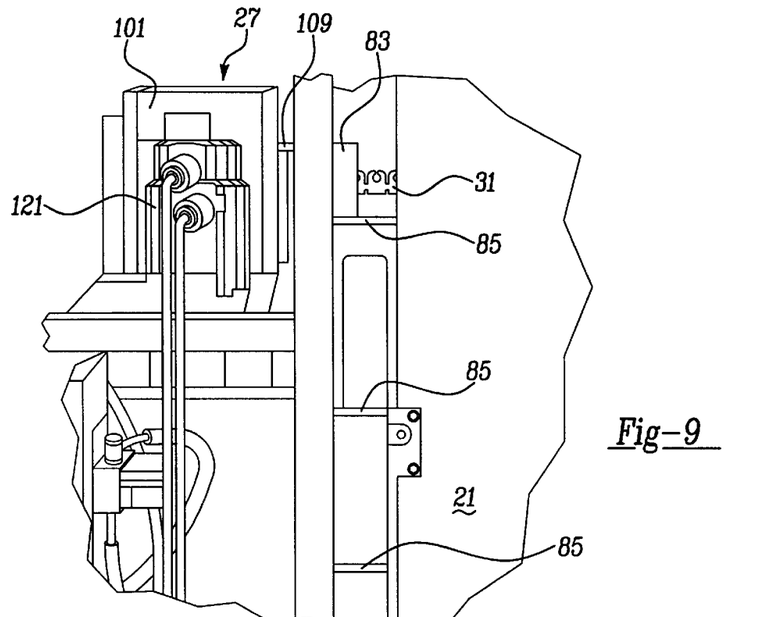
FIG. 9 is a fragmentary side elevational view showing the preferred embodiment part feeder system with a cover and guide removed from a part presentation unit.

Referring to FIGS. 6–9, part presentation unit 27 has an elongated part handling track 81 extending throughout its length. Track 81 is essentially formed by two metallic members fastened together to define an internal passageway. It is envisioned that an ultra high molecular weight polyethylene sheet be mounted to each internal surface defining the passageway in track 81 to provide a lubricious surface for enhancing the movement of parts therein. A concave and V-shaped inlet 83 of each track 81 operably mates with bevels 71 of guides 69 projecting from part shipping container 21, when shipping container 21 is assembled to part presentation unit 27, as shown in FIGS. 2 and 9.

A rack actuating rod 85, also known as a spool feed pin has a distal end welded to an internal frame 87 within presentation unit 27. Rod 85 projects through an aperture in a cover 89 of part presentation unit 27 such that distal end 91 engages the accessible corresponding end of rack 73 within part shipping container 21. A thin plastic sheet or vapor barrier (not shown) covers the openings of shipping container 21 such that the vapor barrier must be pierced or broken through insertion of inlets 83 and rods 85. This will naturally occur through linear insertion of shipping container 21 to engage part presentation unit 27. Therefore, when rod 85 actuates initial feeding device 63 of shipping container 21, the web of parts 31 will be automatically advanced a predetermined amount depending upon different gear ratios, roller sizes, rod lengths or the like. This automatic actuation causes reel 25 to rotate by overcoming the pressure of friction brake 61, whereby parts 31 will be initially fed into track 81 of part presentation unit 27. It is alternately envisioned that a separate brake release pin (not shown) may be necessary to disengage or release a brake or other reel locking mechanism, so as to allow rotation of reel 25 when desired. An optical sensor or electrical switch could also be alternately used to determine the positioning of container 21 and to electrically cause automatic initial feeding of parts 31. However, the preferred mechanical feed interface is deemed more reliable and cost effective.

Figure 10:
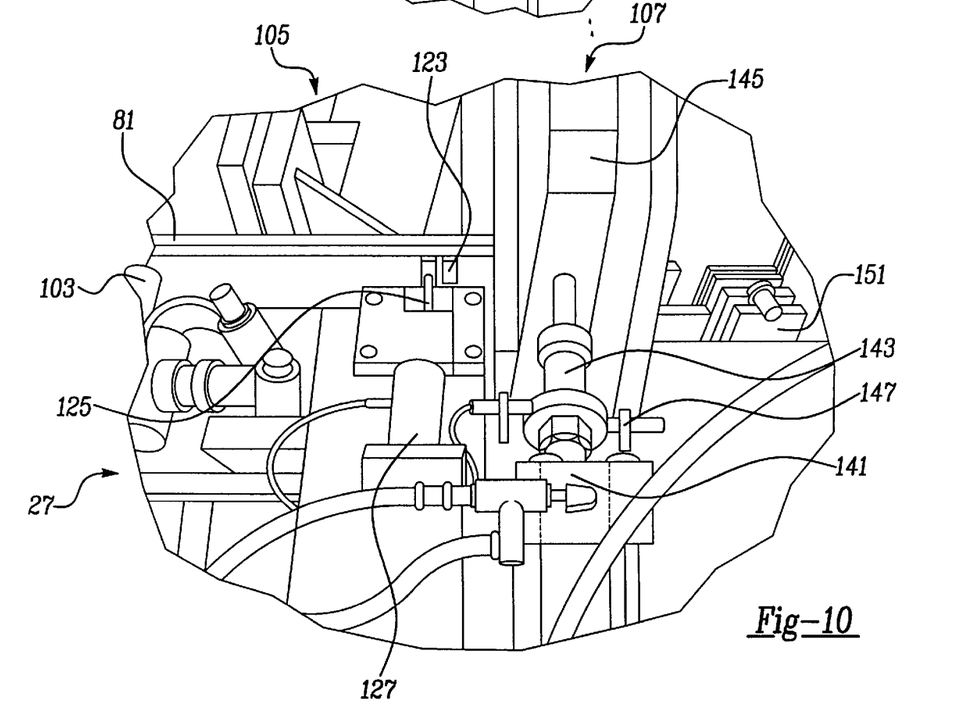
FIG. 10 is a fragmentary perspective view, opposite that of FIG. 9, showing piloting and cut-off stations of the preferred embodiment part feeder system, with the cover removed from the part presentation unit.

FIGS. 9 and 10 show a servo feeding station 101, pilot station 105, and cut-off station 107 as part of part presentation unit 27. A first magnetic proximity switch 109 senses the web of parts 31 travelling therepast in track 83 and sends an electrical signal to an electronic control unit, such as a microprocessor or process controller 111 (see FIGS. 1 and 12). A Micrologics Inc. controller has been found suitable. Alternately, a first sensing device may simply sense the presence of shipping container 21 to cause a feeding servo control unit and power supply to be activated.

Returning again to the preferred embodiment, when the processor receives the appropriate signal from first proximity switch 109, the processor will activate an electromagnetic solenoid 103 to move a pair of rubber coated metal feed rollers toward each other within servo feeding station 101. These rollers look generally like rollers 65 and 67 (see FIG. 7). The web of parts 31 is pinched or clamped between the rollers of servo feeding station 101 when solenoid 103 is energized. A direct current, electrical stepper motor 121 is subsequently energized by the processor. Electric motor 121 drivably rotates the rollers which, in turn, further pulls the web of parts 31 from the reel within shipping container 21. The web of parts 31 is exposed to the rollers due to opposing voids in track 81.

The processor causes the rollers within servo feeding station 101 to continue advancing the web of parts 31 through track 81 until a sensed target part is linearly moved to a second proximity switch 123. When the sensed target part is sensed by second proximity switch 123, a signal is sent to the processor which then temporarily de-energizes electric motor 121 to stop movement of the web of parts 31. At this point, a bifurcated pilot blade or pin 125 is linearly inserted into a slot in the side of track 81 when a pneumatic cylinder 127 is actuated by the processor. A compression spring serves to return pilot pin 125 when the operation is complete. When inserted, pilot pin 125 engages top and bottom external edges at bridging tab 33 between two adjacent parts 31. This piloting operation serves to register and precisely locate the web of parts 31 for subsequent severing. A limit switch is located on pneumatic cylinder 127 to prevent parts 31 from further advancing if the air cylinder is not fully advanced due to pilot pin-to-bridging tab misalignment.

When pilot pin 125 engages the web of parts 31, cut-off station 107 is concurrently energized by the processor. A hydraulic cylinder 141 of cut-off station 107 operably advances a punch tool 143 for insertion into an aperture of track 81 disposed inside a casting block 145. The end of punch 143 has a flat rectangular shape which forcibly compresses bridging tab 33 (see FIG. 3) against an opposing stationary die. This punching action operably severs the entire connecting tab so as to cut a discrete finished part 31 from the continuous web. A third proximity switch 147 interfaces with hydraulic cylinder 141 to sense if the piston in the hydraulic cylinder does not completely advance. If such a condition is detected by the processor from third proximity switch 147, then the processor will energize electric motor 121 in a reverse direction to back up the web of parts 31 and then reposition them for subsequent punching in the cut-off station 107. It should be appreciated that while hydraulic and pneumatic cylinders are disclosed for many stations, electrical driving mechanisms may also employed.

The scrap generated by removal of bridging tabs 33 between parts 31 is extracted from the punch and die by use of a stripper spring and/or gravity. Each scrap tab 33 (see FIG. 3) falls below casting block 145 and is guided into a receptacle 158 by an angled chute 159. Chute 159 is fully enclosed, but shown fragmented in the figures. The scrap is then automatically moved, preferably by gravity, or alternately through a spring biasing or other mechanical shoveling device, through an opening 160 (see FIG. 1) of part presentation unit 27 and into an adjoining openly accessible scrap collection bin 162 of shipping container 21. Thereafter, the collected scrap can be removed at the remote supplier location.

Figure 11:
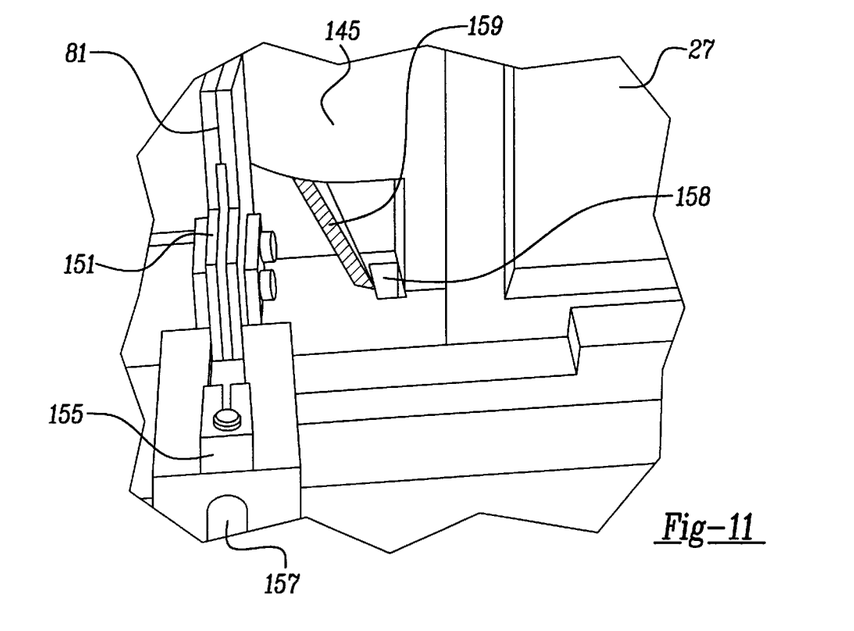
FIG. 11 is a fragmentary perspective view showing an escapement mechanism and scrap chute employed in the preferred embodiment part feeder system.
Figure 12:
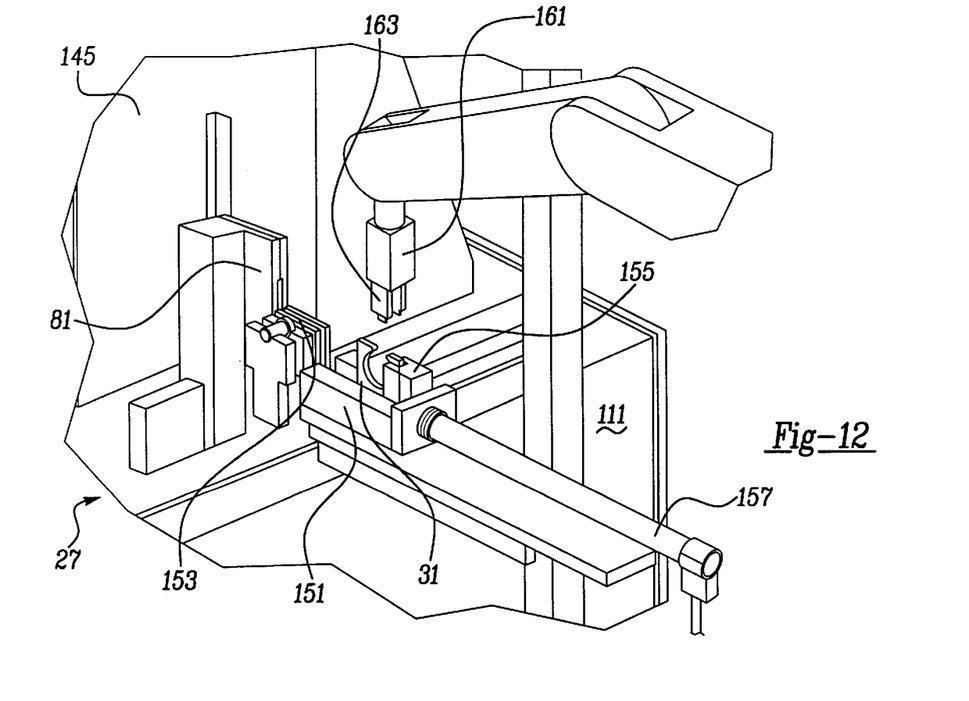
FIG. 12 is a fragmentary perspective view showing the preferred embodiment part feeder system employing a weld head of a robot about to grasp a severed and finished part from the escapement mechanism, for use in a subsequent welding operation.

Referring now to FIGS. 10–12, the severed and finished parts 31 are stacked up against each other within track 81 at an escapement mechanism 151. Continued advancing of the web will cause the current leading part 31 to linearly slide along escapement mechanism 151 which includes an opentop half-track 153 which is a continuation of track 81. A single leading part 31 is then linearly separated from the others, one at a time, when it is received in a slotted shuttle 155. A pneumatic piston cylinder 157 of escapement mechanism 151 is coupled to shuttle 155 for moving shuttle 155 and the part 31 held therein toward and away from half-track 153. This shuttle presentation action has been found necessary due to the clearance requirements of the weld head gas shield relative to the presentation unit.

The stamped metal part 31 is presented to a weld head 161 of a six-axis, rotatable robot 26 (see FIGS. 1 and 2), after the single part has been punched free or severed from its metal strip by the punch. Weld head 161 has a pair of tongs or pincers 163 of conventional design which grasp the presented part 31 for a subsequent weld operation in an automotive vehicle. Part 31 is drawn arc welded to the vehicle body. Part 31 is a flat bracket having an openly accessible pair of curved fingers defining a partially circular inner edge for receiving brake hoses, fuel hoses, wires or the like. A plastic member may be used to couple the hoses or wires to the bracket.

Three apertures and escapement mechanisms 151 are shown in part presentation unit 27 in FIG. 2, which correspond to three pallets and reels in shipping container 21. More or less mechanisms 151 and reels may be provided, depending upon the size of the presentation unit, the number of pallets used in the shipping container, the number or speed of robots, and the type and variety of parts used. Each reel may contain differently shaped parts which are to be used on different vehicle styles or usage applications. It should be understood as well, that if more than one feeding station, piloting station, separating station and escapement mechanism are used, such as the three shown, then the weld head will cooperate sequentially with one aperture, then the next and the next, until all the parts are presented for use to the welder, and that this timing operation will be controlled by the electronic control unit 111.

While the preferred embodiment of the part feeder system has been disclosed, it should be appreciated that other variations may be employed without departing from the present invention. For example, a variety of other metal or plastic parts can be employed with the present invention in place of the exemplary brackets shown. Furthermore, parts may be stored in the shipping container other than in reel form, as long as automated part handling and feeding is achieved. Moreover, it is envisioned that the reel braking, initial roller feeder and rack-and-pinion actuation can be substituted with alternate electrical or mechanical devices as long as the automated nature of the part handling and feeding is achieved. Similarly, other electrical or mechanical systems may be readily substituted for the servo feeding, piloting, separating and presentation stations as long as those automated features are functionally provided. These different stations may also be disposed outside of a self contained unit provided, however, that automated part handling is used. Moreover, the final presented parts can be manually withdrawn from the escapement mechanism and may be used in assembly steps other than welding or for automotive vehicles. While various materials and actuators have been disclosed, it should be appreciated that other materials and actuators may be employed. It is intended by the following claims to cover these and any other departures from the disclosed embodiments which fall within the true spirit of this invention.

The invention claimed is:

1. An automated system for use with a set of joined parts, the apparatus comprising:

a container operable to store the parts; and a unit having a part feeding station, a part separating station and a part presentation station;

the container being movable relative to the unit such that if the container is positioned adjacent the unit, the feeding station is operable to automatically withdraw the joined parts from the container;

the feeding station being operable to transfer the joined parts to the separating station wherein the parts are operably detached from each other; and the part presentation station being operable to allow removal of the separated parts from the unit.

2. The apparatus of claim 1 further comprising an initial part feeding mechanism located in the container, the initial part feeding mechanism being operable to initially expose the parts from the container for access by the feeding station of the unit.

3. The apparatus of claim 2 further comprising a reel located in the container, the reel being operable to store the joined parts in a spiraling manner, and the reel being rotatable to advance the parts from the container to the unit.

4. The apparatus of claim 3 wherein the initial feeding mechanism includes a pair of rollers operably pulling a plurality of the parts from the reel and then pushing the plurality of parts external to the container to allow engagement of at least some of these parts by the feeding station inside the unit.

5. The apparatus of claim 4 further comprising:

a pinion gear coupled to at least one of the rollers of the initial feeding mechanism; and a rack having a set of gear teeth engagably driving the pinion gear and rollers when a portion of the unit actuates the rack.

6. The apparatus of claim 3 further comprising a second reel located in the container, the second reel being operable to store the joined parts in a spiraling manner, and the reel being rotatable to advance the parts from the container to the unit.

7. The apparatus of claim 1 further comprising a part alignment mechanism located in the unit and being operable to assure proper alignment of the joined parts to encourage proper separation of at least a pair of the parts at the separation station.

8. The apparatus of claim 7 wherein the alignment mechanism includes a pilot pin engagable with a feature movable with the joined parts, the separation station being prevented from separating at least a pair of the parts if the alignment mechanism indicates improper alignment of the parts.

9. The apparatus of claim 1 wherein the separation station includes a punch which operably severs an adjacent pair of the parts.

10. The apparatus of claim 1 further comprising:

a sensor located in the unit operably sensing the presence of the parts in the unit;

the feeding station in the unit includes a pair of rotatable rollers and a roller actuator; and the roller actuator being energizable to cause the rollers in the unit to pull the joined parts from the container and into the unit if the sensor determines that the joined parts are present in the unit.

11. The apparatus of claim 1 further comprising:

a robot operable to remove a part made accessible in the part presentation station; and a second actuator moving the accessible part away from the part separation station after the part is separated.

12. An automated part feeder system comprising:

a web of attached parts;

a movable shipping container storing the web of parts, the shipping container having a part feeding mechansim; and a part processing unit operable to separate the parts from the web;

the web of parts being automatically fed from the container to the unit when the container is positioned at a predetermined location relative to the unit, the parts being separated from each other in the unit subsequent to automatic feeding of the web into the unit.

13. The system of claim 12 wherein the web of parts are a series of stamped metal parts connected together by separable bridging segments.

14. The system of claim 13 wherein each part is an automotive vehicle bracket.

15. The system of claim 12 wherein the unit includes a second part feeding mechanism, a part separating station and a part presentation station.

16. A part handling system comprising:

a shipping container having a reel of parts;

a part processing unit having a tool acting on the parts thereby causing undesired scrap, the container being removably attachable to the unit, the parts being transportable from the container to the unit; and a chute located in the unit operably transporting the scrap from the tool to the container such that removal of the container from the unit allows for removal of at least a majority of the scrap from the unit.

17. The system of claim 16 wherein the tool separates at least one of the parts from a web joining multiple of the parts.

18. The system of claim 17 wherein the tool is a punch which removes a connecting segment that joins adjacent of the parts together.

19. The system of claim 16 further comprising a feeding mechanism operable to automatically transport the parts from the container to the unit when the container is placed in a predetermined location relative to the unit.

20. A method for feeding parts comprising:

(a) stamping parts as part of a metal strip;

(b) winding the metal strip with the stamped parts on a reel;

(c) storing the reel in a shipping container;

(d) feeding the parts from the reel into a separately housed part presentation unit;

(e) removing the parts from the strip; and (f) conveying scrap from the metal strip left over from step (e) to the shipping container.

21. The method of claim 20 further comprising sequentially feeding the parts to an automatic welding device.

22. The method of claim 20 further comprising:

(a) moving the shipping container toward the part presentation unit;

(b) contacting a first member of the part presentation unit against a second member of the shipping container; and (c) automatically feeding the strip from the reel to the part presentation unit in response to step (b).

23. A method of transporting parts from a removable shipping container to a substantially stationary processing unit positioned on a moving assembly line, the method comprising:

(a) loading the container at a location remote to the processing unit;

(b) moving the container to a predetermined locational range adjacent the unit;

(c) actuating an automatic part feeding mechanism after step (b);

(d) sensing the presence of at least one of: (i) the container relative to the unit, and (ii) the parts in the unit;

(e) automatically advancing the parts from the container to a part separating station in response to step (c); and (f) removing the separated parts from the unit.

24. The method of claim 23 further comprising rotating a reel containing a set of the parts which are joined together in the container.

25. The method of claim 24 further comprising inserting a member between a pair of the parts in the unit to ensure alignment of a part separating punch.

26. The method of claim 23 further comprising removing separated ones of the parts from the unit with a robot.

27. The method of claim 26 further comprising automatically welding the removed part to a workpiece on a moving assembly line.

28. An automated part feeder system comprising:

a part storage container;

at least one part pallet moveable relative to the part storage container;

at least one reel mountable to the pallet; and a web of attached parts wound around the reel.

29. The apparatus of claim 28 further comprising a brake operable to stop the rotation of the reel.

30. The apparatus of claim 28 further comprising a guide operably controlling the direction of movement of the parts when they are fed from the reel.

31. The apparatus of claim 28 wherein the part storage container is mobile.

32. The apparatus of claim 28 wherein each pallet has at least one roller to facilitate the rotation of the reel.

* * * * *